(12) United States Patent
van Stiphout

(10) Patent No.: US 9,180,817 B2
(45) Date of Patent: Nov. 10, 2015

(54) EXTERIOR MIRROR UNIT, MIRROR SUPPORT, METHOD FOR ASSEMBLY OF AN EXTERIOR MIRROR UNIT

(75) Inventor: Paulus Gerardus Maria van Stiphout, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 318 days.

(21) Appl. No.: 13/574,753

(22) PCT Filed: Jan. 25, 2011

(86) PCT No.: PCT/NL2011/050045
§ 371 (c)(1),
(2), (4) Date: Oct. 26, 2012

(87) PCT Pub. No.: WO2011/090385
PCT Pub. Date: Jul. 28, 2011

(65) Prior Publication Data
US 2013/0050856 A1 Feb. 28, 2013

(30) Foreign Application Priority Data
Jan. 25, 2010 (NL) .................................... 2004142

(51) Int. Cl.
*G02B 5/08* (2006.01)
*B60R 1/074* (2006.01)

(52) U.S. Cl.
CPC ............ *B60R 1/074* (2013.01); *Y10T 29/49826* (2015.01)

(58) Field of Classification Search
CPC ........ B60R 1/074; B60R 1/076; B60R 1/078; B60R 1/06; B60R 1/0605; G02B 7/182

USPC .......................................... 359/841, 872, 877
See application file for complete search history.

(56) References Cited

U.S. PATENT DOCUMENTS

| 6,637,898 | B2 | 10/2003 | Hattori et al. |
| 7,354,165 | B1 | 4/2008 | Ruse et al. |
| 7,815,324 | B2 * | 10/2010 | Sakata .......................... 359/841 |
| 2003/0058554 | A1 | 3/2003 | Hayashi et al. |
| 2006/0165477 | A1 | 7/2006 | Schuurmans |
| 2009/0086351 | A1 | 4/2009 | Sakata |

FOREIGN PATENT DOCUMENTS

| CN | 1375418 A | 10/2002 |
| CN | 1706689 A | 12/2005 |
| CN | 1922052 A | 2/2007 |

(Continued)

OTHER PUBLICATIONS

International Search Report from PCT/NL2011/050044 (WO 2011/090384), dated Apr. 29, 2011.

(Continued)

*Primary Examiner* — Euncha Cherry
(74) *Attorney, Agent, or Firm* — Swanson & Bratschun, L.L.C.

(57) ABSTRACT

Exterior mirror unit comprising a mirror base for attachment to a motor vehicle, a mirror support connectable with the mirror base and an actuator unit placed between the mirror support and mirror base for pivoting adjustment of the mirror support relative to the mirror base, wherein the mirror support is connectable with the actuator unit and the mirror base in a manner detachable as a whole.

14 Claims, 6 Drawing Sheets

(56) References Cited

FOREIGN PATENT DOCUMENTS

| | | |
|---|---|---|
| CN | 101595101 A | 7/2012 |
| DE | 10162519 A1 | 8/2002 |
| DE | 102008026039 A1 | 12/2009 |
| EP | 0818354 A2 | 1/1998 |
| EP | 1481850 A1 | 12/2004 |
| JP | 60143042 | 9/1985 |
| JP | 60244639 | 12/1985 |
| JP | 61169346 | 7/1986 |
| JP | 1098042 | 6/1989 |
| WO | WO 2011/090384 | 7/2011 |
| WO | WO 2011/090385 | 7/2011 |

OTHER PUBLICATIONS

International Search Report from PCT/NL2011/050045 (WO 2011/090385), dated Apr. 29, 2011.
English Translation of Japanese Office Action for App. No. JP 2012-549964 dated Oct. 27, 2014.
Search Report from CN Application No. 201180009775X dated Jan. 25, 2011.
Office Action from CN 201180009775.X dated Apr. 3, 2015 (w/English Translation).
Office Action from JP 2012-549964 dated Jul. 30, 2015 (w/English Translation).

* cited by examiner

EXTERIOR MIRROR UNIT, MIRROR SUPPORT, METHOD FOR ASSEMBLY OF AN EXTERIOR MIRROR UNIT

RELATED APPLICATIONS

This application is a 35 U.S.C. §371 national phase application of PCT/NL2011/050045(WO 2011/090385) filed on Jan. 25, 2011, entitled "Exterior Mirror Unit, Mirror Support, Method for Assembly of an Exterior Minor Unit", which application claims the benefit of Netherlands application Serial No. 2004142, filed Jan. 25, 2010, each of which is incorporated herein by reference in its entirety.

TECHNICAL FIELD

The invention relates to an exterior mirror unit for a motor vehicle.

BACKGROUND

An exterior mirror unit for a motor vehicle is generally known. The exterior mirror unit usually comprises a mirror base for attachment to the motor vehicle and a mirror support to which a mirror element can be attached. An exterior mirror unit may be provided with an actuator unit for pivoting adjustment of the mirror support relative to the mirror base. Around the mirror support a mirror cap may be arranged, for instance as a protection of the mirror support and the components included therein and/or for aerodynamic and/or esthetic reasons. The mirror support is usually pivotable relative to the mirror base substantially about an upward axis between an operational position, a park position and a fold-over position.

In the operational position or fold-out position the mirror support is substantially transverse to the mirror base and/or the motor vehicle. The mirror support is usually in the operational position during use of the motor vehicle, preferably during driving. In the park position or fold-in position the mirror support is substantially along the motor vehicle, with the reflecting element facing the motor vehicle. The mirror support with mirror cap thus hugs the motor vehicle more closely, so that there is less chance of damages. In the fold-over position the mirror support extends substantially forwardly along the motor vehicle, in a direction opposite to the fold-in position. In the fold-over position the reflecting element usually faces away from the motor vehicle. For example, if the mirror support in the fold-in position points substantially towards the rear of the motor vehicle, then the mirror support in the fold-over position extends in a direction oriented substantially towards the front of the motor vehicle. For example, a mirror support may be in the fold-over position as a result of a collision with an object.

Adjustment between the operational position, park position and fold-over position may be done manually or remotely with the aid of an actuator unit which is usually between the mirror support and the mirror base.

A disadvantage of the known exterior mirror units provided with an actuator unit is that when the mirror support, or the mirror cap attached thereto, is damaged, the mirror support cannot, or cannot readily, be removed from the actuator unit and/or the mirror base. Accordingly, along with the mirror support, also the actuator unit is removed from the mirror base and a wholly new mirror support, including new actuator unit, is assembled. As an actuator unit is one of the more expensive parts of an exterior mirror unit, this makes replacement of the mirror support relatively expensive.

SUMMARY OF THE INVENTION

An object of the invention is to provide an exterior mirror unit, a damaged mirror support and/or mirror cap of which are simpler and cheaper to replace.

To this end, the invention provides an exterior mirror unit comprising a mirror base for attachment to a motor vehicle, a mirror support connectable with the mirror base and an actuator unit placed between the mirror support and mirror base for pivoting adjustment of the mirror support relative to the mirror base, wherein the mirror support is connectable with the actuator unit and the mirror base in a manner detachable as a whole.

By providing a mirror support that is connectable with the actuator unit and the mirror base in a manner detachable as a whole, the mirror support can be detached from the actuator unit in a simple manner. After the mirror support has been detached from the actuator unit, the actuator unit remains connected with the mirror base. Thus, in a simple manner a new mirror support can be connected with the actuator unit and the mirror base. By detaching the mirror support as a whole from the actuator unit, removing the mirror support can involve a limited number of operations and, partly owing to this, be relatively cheap.

Accordingly, when replacing a damaged mirror support and/or a mirror cap connected therewith, only the mirror support and mirror cap need to be removed and a new mirror support and mirror cap placed. The actuator unit can be preserved, so that this relatively expensive part does not need to be replaced. Replacement of a mirror support and/or mirror cap can thus at the same time become cheaper. Also transport and stocking costs can decrease in that the relatively expensive and relatively heavy actuator unit no longer needs to be kept in stock as part of the mirror support and transported, but only stocking and transport of the lighter and cheaper mirror support is necessary.

Advantageously, the mirror support is detachably connectable with the actuator unit with the aid of at most one fixing means. By only fixing the actuator unit with the mirror support with the aid of at most one fixing means, the number of parts and hence costs can be reduced. The actuator unit can, for example, be received in the mirror support and/or be attached to the mirror support. By only fixing the actuator unit to the mirror support with the aid of at most one fixing means, the mirror support can be connected with and disconnected from the actuator unit in a simple manner, so that the mirror support can be detached as a whole from the actuator unit. The fixing means can be, for example, a screw, a clamp, a snap finger, a hook, a wedge or other fixing means. Many variants are possible. Also, use can be made of a detachable connection without a separate connecting element such as a screw or a clamp or a hook being needed. For example, the fixing means may be implemented as a snap connection which is part of the mirror support and/or the actuator unit. By providing a detachable connection without separate connecting element, further, costs can be saved. For example, on the mirror support a snap finger may be provided and on the actuator unit a snap finger may be provided, which after assembly interlock to fix the actuator unit in the mirror support. The snap fingers then form the fixing means. By releasing either of the snap fingers, for example with tongs or by hand, the connection can be simply released and the mirror support detached from the actuator unit.

Preferably, the fixing means is accessible also after fixation of the mirror support with the actuator unit. Possibly, the fixing means may be freely accessible. Preferably, however, after installation, the fixing means is more or less screened, for example by a mirror element which can be assembled in the mirror support. By removing the mirror element, which can be done relatively simply, the fixing means may be freely accessible to, for example, a mechanic. The mechanic can then simply release the fixing means and detach the mirror support, with mirror cap provided thereon, from the actuator unit and the mirror base. Also, the mechanic can simply connect a new mirror support with the actuator unit again.

In a preferred embodiment, the mirror support is provided with a reception facility for receiving the actuator unit in the mirror support in case of mirror supports where the actuator unit is received substantially in the mirror support, or to the mirror support in case of mirror supports where the actuator unit is situated substantially next to the mirror support. The reception facility is provided as an additional facility, for example, a cutout or a slot in an otherwise closed part of the mirror support construction. For example, in the prior art the mirror support may be open at an underside, along which the actuator unit can be assembled in the mirror support. By providing an additional reception facility, for example, a cutout or slot in the side and/or top, the actuator unit can more simply be received in the mirror support and the mirror support can more simply be detached as a whole from the actuator unit.

The invention further relates to a mirror support.

The invention also relates to a method for assembly of an exterior mirror unit.

Further advantageous embodiments are represented in the subclaims.

BRIEF DESCRIPTION OF THE DRAWINGS

The invention will be further elucidated on the basis of preferred embodiments which are represented in a drawing. In the drawing.

DETAILED DESCRIPTION

Figure 1:
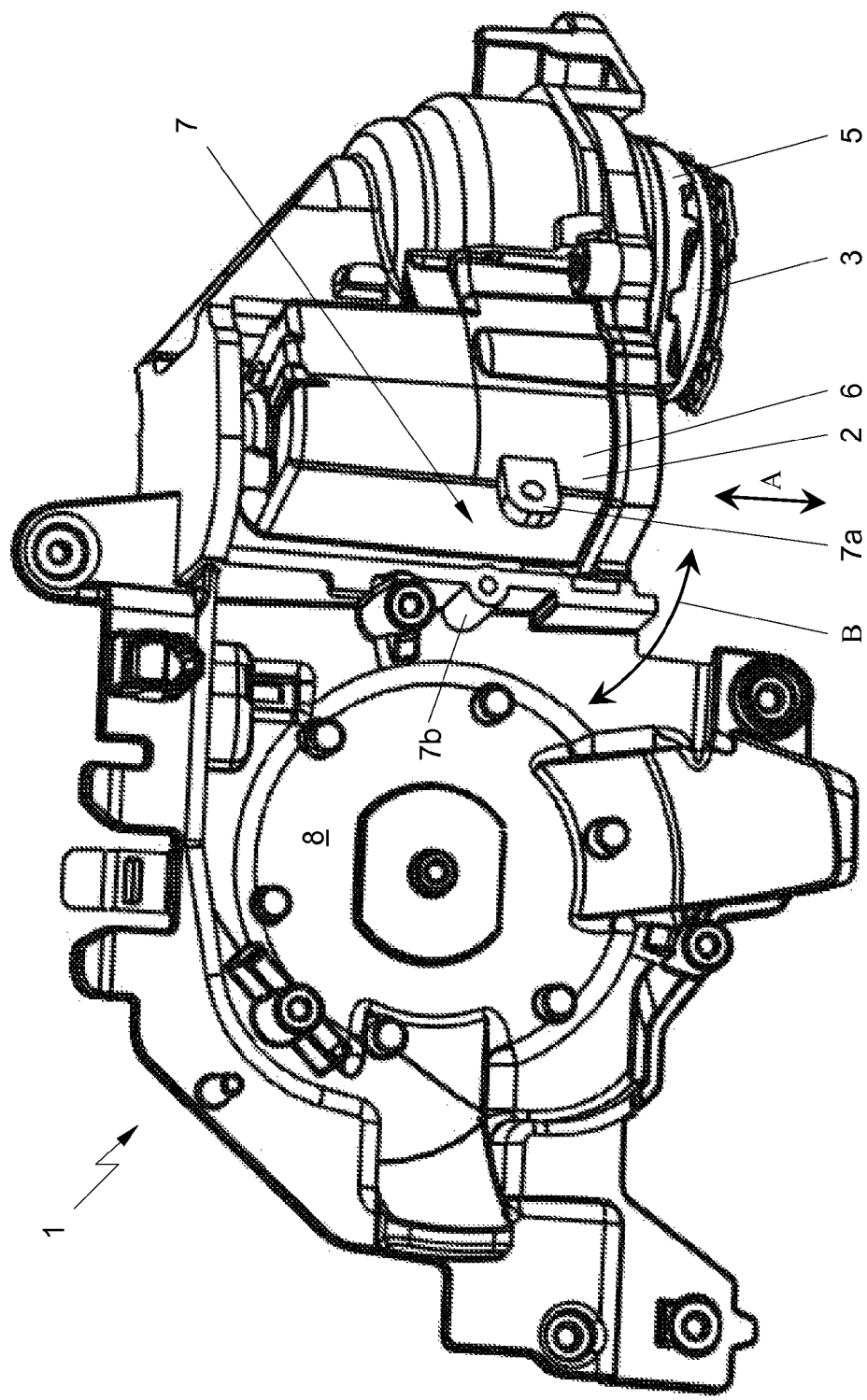
FIG. 1 shows a schematic perspective view of a front of a first embodiment of a mirror support with actuator unit in an intermediate position of assembly according to the invention.

In the drawing, like parts are designated with like reference numerals. The drawing is given by way of non-limiting exemplary embodiment.

FIG. 1 shows a mirror support 1 in which an actuator unit 2 can be received. Via a connecting element 3, here a bayonet connection, the actuator unit 2 can be connected with a mirror base. The mirror base is not shown here. The mirror support 1 and the actuator unit 2 are usually included in an exterior mirror unit for a motor vehicle. Around the mirror support 1 a mirror cap, not shown here, may be placed. The mirror cap can be connected with the mirror support and usually surrounds the mirror support for esthetic and/or aerodynamic reasons and/or to protect the mirror support and any components thereof.

The mirror support 1 is designed to receive a reflecting element, for example, a mirror element. A mirror element, and any components connected therewith, such as, for example, an adjustment device, can, in this exemplary embodiment, be placed in a reception area 8 of the mirror support 1. The mirror element is not represented in the Figures.

The actuator unit 2 is designed for pivoting adjustment of the mirror support 1 relative to the mirror base. Preferably, the mirror support 1 is adjustable relative to an upward axis between an operational position, a park position and a fold-over position. In the operational position the mirror support is substantially transverse to a longitudinal direction of the motor vehicle. In the park position the mirror support is substantially along the motor vehicle, with a mirror element facing the motor vehicle. In the fold-over position the mirror support is also substantially along the motor vehicle, but forwardly, with the mirror element facing away from the motor vehicle. Such a position will be taken up only exceptionally, for example, after a collision of the exterior mirror unit with an object.

To make replacement and/or assembly and/or disassembly of a mirror support 1 and/or mirror cap relatively simple and inexpensive, the mirror support 1 is designed to be detached as a whole from the actuator unit 2 and the mirror base. After the mirror support 1 has been detached from the actuator unit 2, the actuator unit 2 remains connected with the mirror base. Therefore, only the mirror support 1 and possibly the mirror cap need to be replaced, when the mirror support and/or the mirror cap and/or parts thereof are, for example, damaged. In this way, the relatively expensive actuator unit can remain connected with the mirror base and be preserved.

By attaching and detaching the mirror support 1 as a whole to and from the actuator unit 2, assembly and/or disassembly of the mirror support to and from the actuator unit can be done relatively easily and hence inexpensively.

In the exemplary embodiment shown in FIG. 1 the mirror support 1 is provided with a cutout 4 for receiving the actuator unit 2 through an axial movement and a pivoting movement. First, through an axial movement, indicated with arrow A, the actuator unit 2 is slid along an underside of the mirror support 1 partly into the mirror support 1. A first part 5 of the actuator unit 2 can thus be received in the mirror support 1. A second part 6 of the actuator unit 2 is still partly outside the mirror support 1, as shown in FIG. 1. FIG. 1 accordingly shows an intermediate position of the assembly. The second part 6 can thereupon, through a pivoting movement, indicated with arrow B, be moved into the mirror support 1 through the additional reception facility 4 of the mirror support. After pivoting, the actuator unit 2 is substantially completely included in the mirror support 1, and the actuator unit 2 is in an end position of the assembly. The additional reception facility 4 in this exemplary embodiment is implemented as a cutout 4 in a side of the mirror support 1.

The actuator unit 2 can thereupon be fixed to the mirror support 1 with a fixing means 7. The fixing means 7 here comprises an eye 7a connected with the actuator unit 2, and a bush 7b on the mirror support 1. Through the eye 7a, for example, a screw may be applied, which can be screwed into the bush 7b. The bush 7b may or may not be provided with internal thread. The fixing means can comprise a loose part, such as, for example, a screw, or may only include parts that are connected with the mirror support and/or the actuator unit, such as, for example, a snap connection or a ratchet connection.

Figure 2:
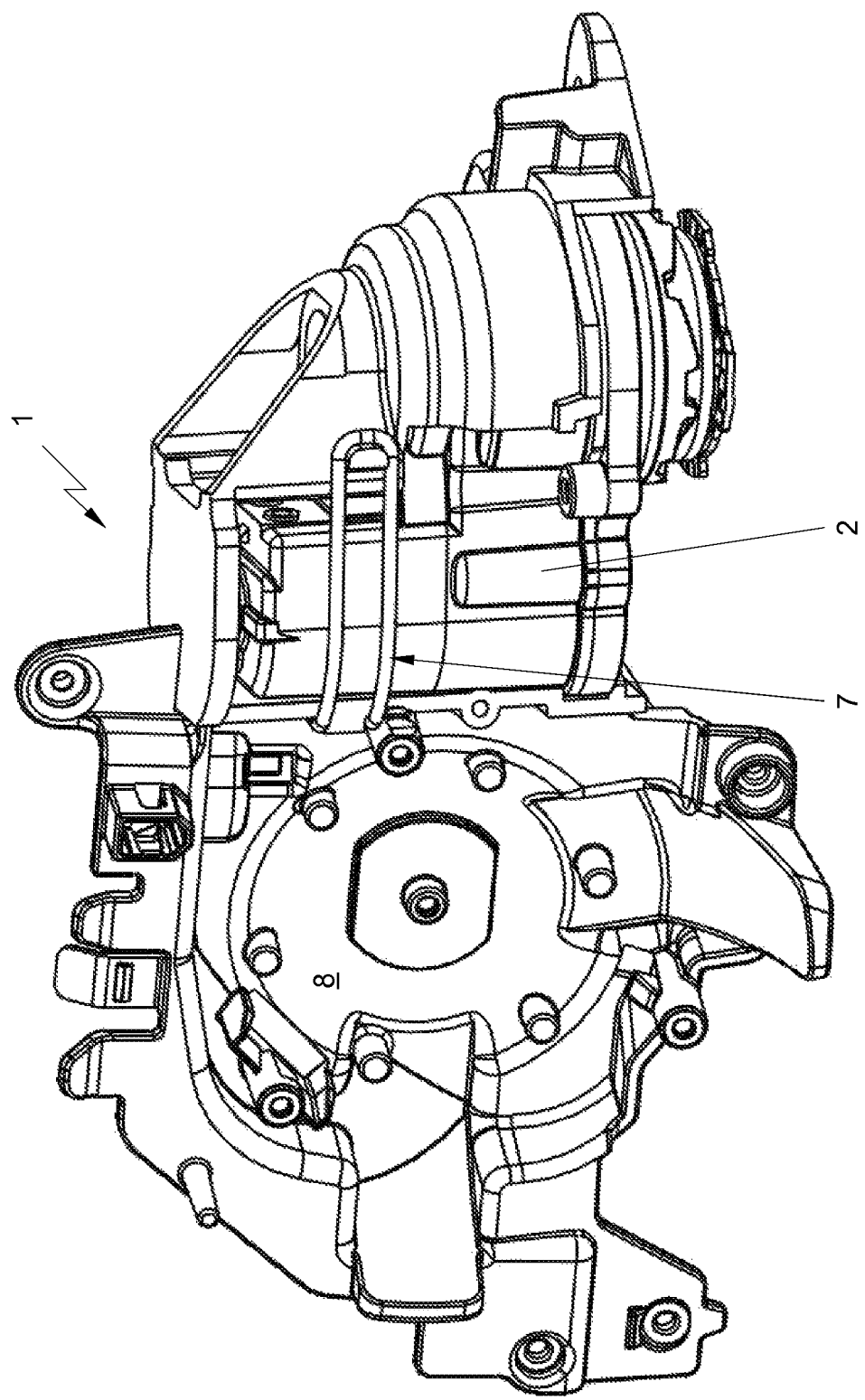
FIG. 2 shows a schematic perspective view of a front of a second embodiment of a mirror support with actuator unit in a fixed assembly position according to the invention.

FIG. 2 shows an alternative embodiment of the fixing means 7, which is here designed as a clip to fix the actuator unit 2 in the mirror support 1. FIG. 2 shows the actuator unit 2 and the mirror support 1 in the fixed assembly position.

Only one fixing means 7 is utilized to fix the actuator unit 2 in the mirror support 1. The fixing means 7 is moreover simply accessible after assembly of the exterior mirror unit with mirror cap and mirror element. During use, the fixing means 7 may be concealed behind the mirror element, so that it is protected to some extent from ambient influences. By taking off the mirror element, which is simple to do as the mirror element is usually attached through a snap connection, the fixing means 7 is rendered well accessible and the fixing means can be released. Possibly, the fixing means may also be accessible without the mirror element being removed and/or with the fixing means being freely accessible from outside. After the fixing means has been released, the mirror support 1 in this exemplary embodiment can be detached from the actuator unit 2 and the mirror base by a pivoting movement in direction B and an axial movement in direction A.

Figure 3:
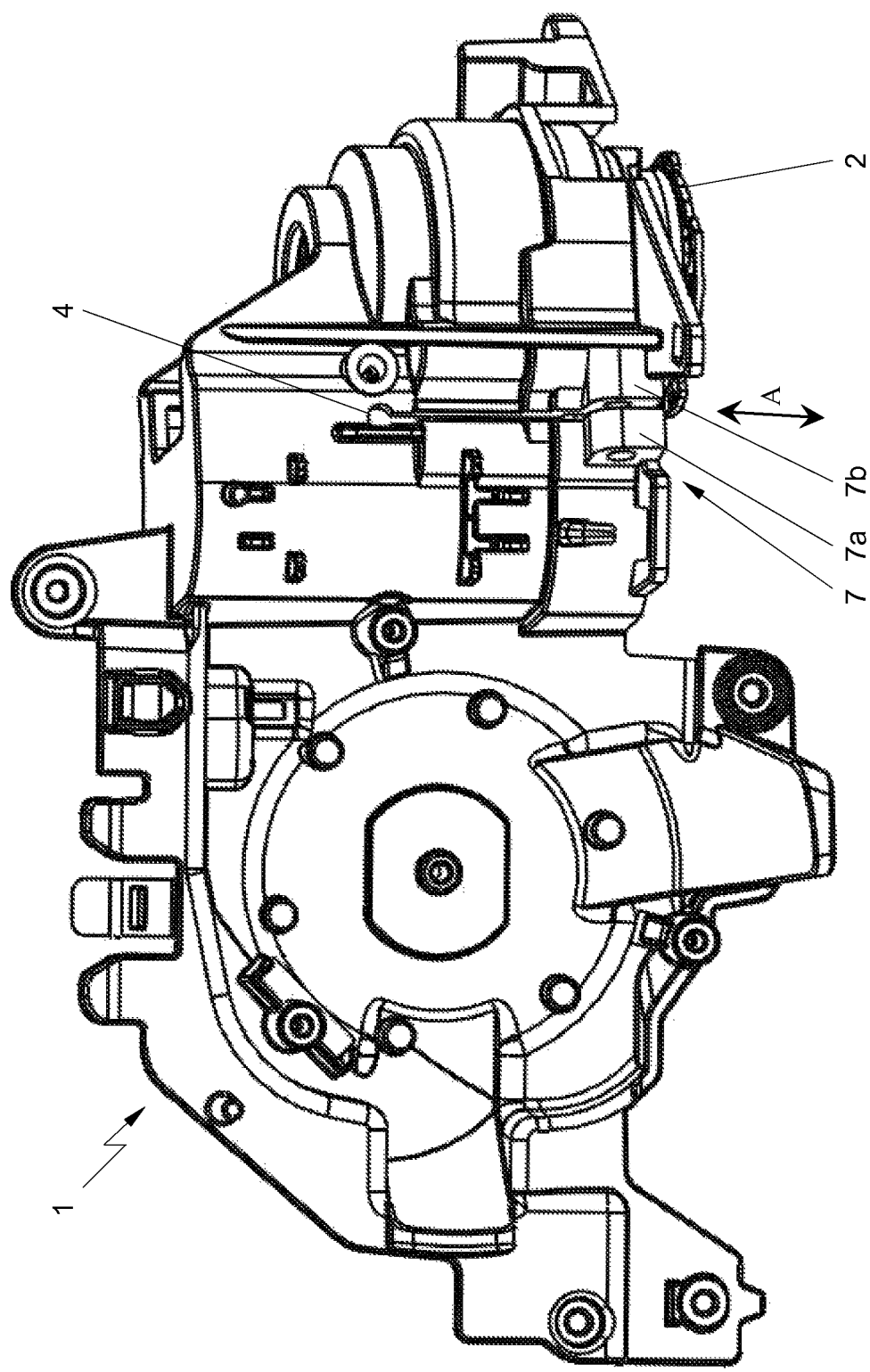
FIG. 3 shows a schematic perspective view of a front of a third embodiment of a mirror support with actuator unit according to the invention.

FIG. 3 shows a further embodiment of a mirror support 1 with an additional reception facility 4. The additional reception facility in this exemplary embodiment is implemented as a slot 4.

Through an axial movement, designated with arrow A, the actuator unit 2 can be slid into the mirror support 1. If the inside dimensions of a reception cavity for the actuator unit 2 in the mirror support 1 are approximately smaller than or equal to the outside dimensions of the actuator unit 2, the slot 4 will yield a little as a result of the actuator unit 2 being slid into the mirror support 1. By thereupon pulling the slot 4 narrower by means of the fixing means 7, the actuator unit 2 can be clamped in the mirror support 1 and thus be fixed.

If the inside dimensions of the reception cavity for the actuator unit 2 in the mirror support 1 are greater than the outside dimensions of the actuator unit 2, the slot 4 will not, or hardly so, yield as a result of the actuator unit 2 being inserted. By means of the fixing means 7 the slot 4 can be pulled narrower and the actuator unit 2 can thereby be clamped in the reception cavity of the mirror support 1.

The fixing means 7 is here designed as an eye 7a and a bush 7b in which a screw can be received, both on the mirror support 1, but may also be designed as a clamp, a clip, a hook, a wedge or in a different manner, which may or may not involve a loose separate connecting means, such as a screw or a pin.

Figure 4:
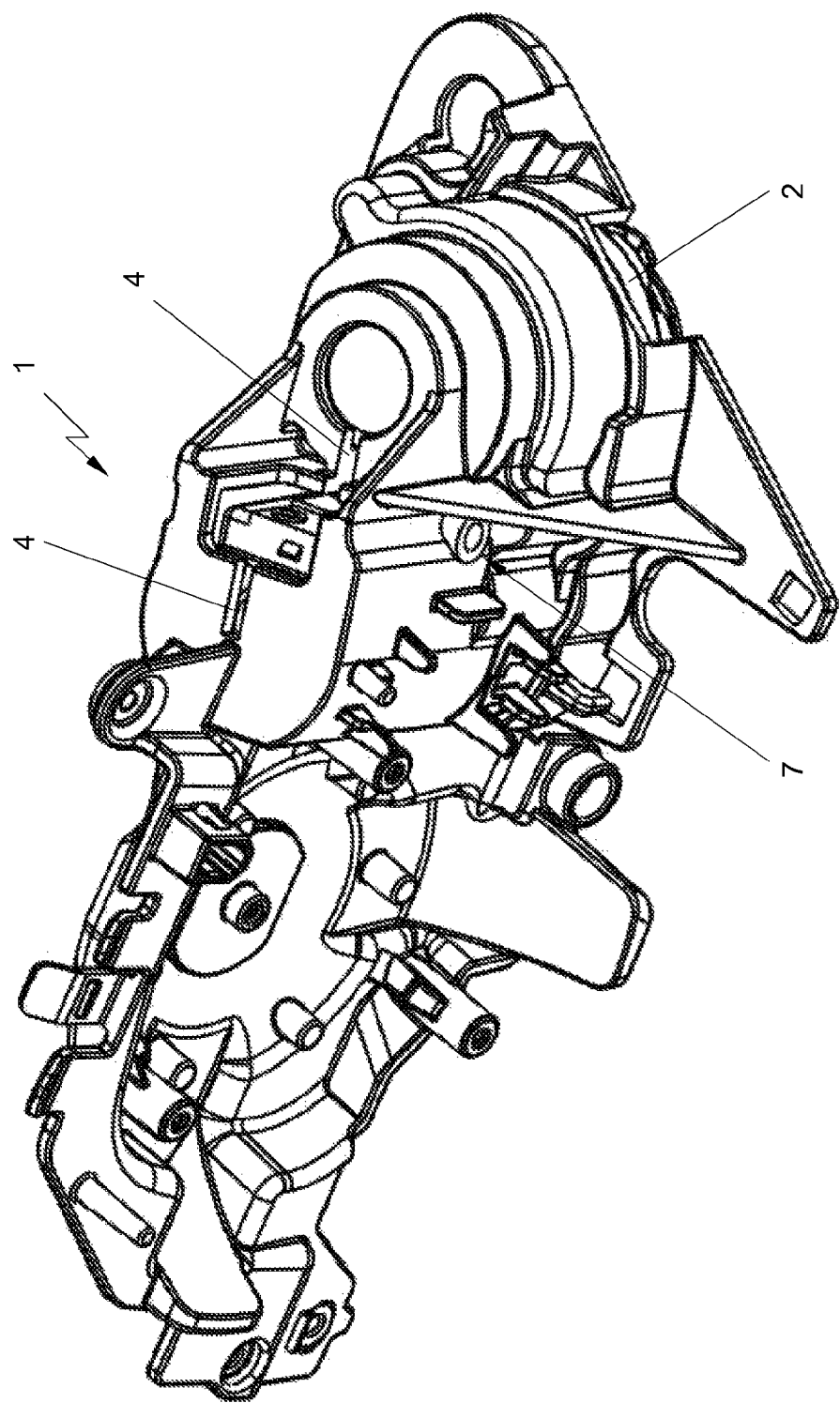
FIG. 4 shows a schematic perspective view of a top of a fourth embodiment of a mirror support with actuator unit according to the invention.

In the exemplary embodiment of FIG. 3, the slot is shown in a side of the mirror support 1. However, the slot 4 may also be provided at the top of the mirror support 1, as shown in FIG. 4.

Figure 5:
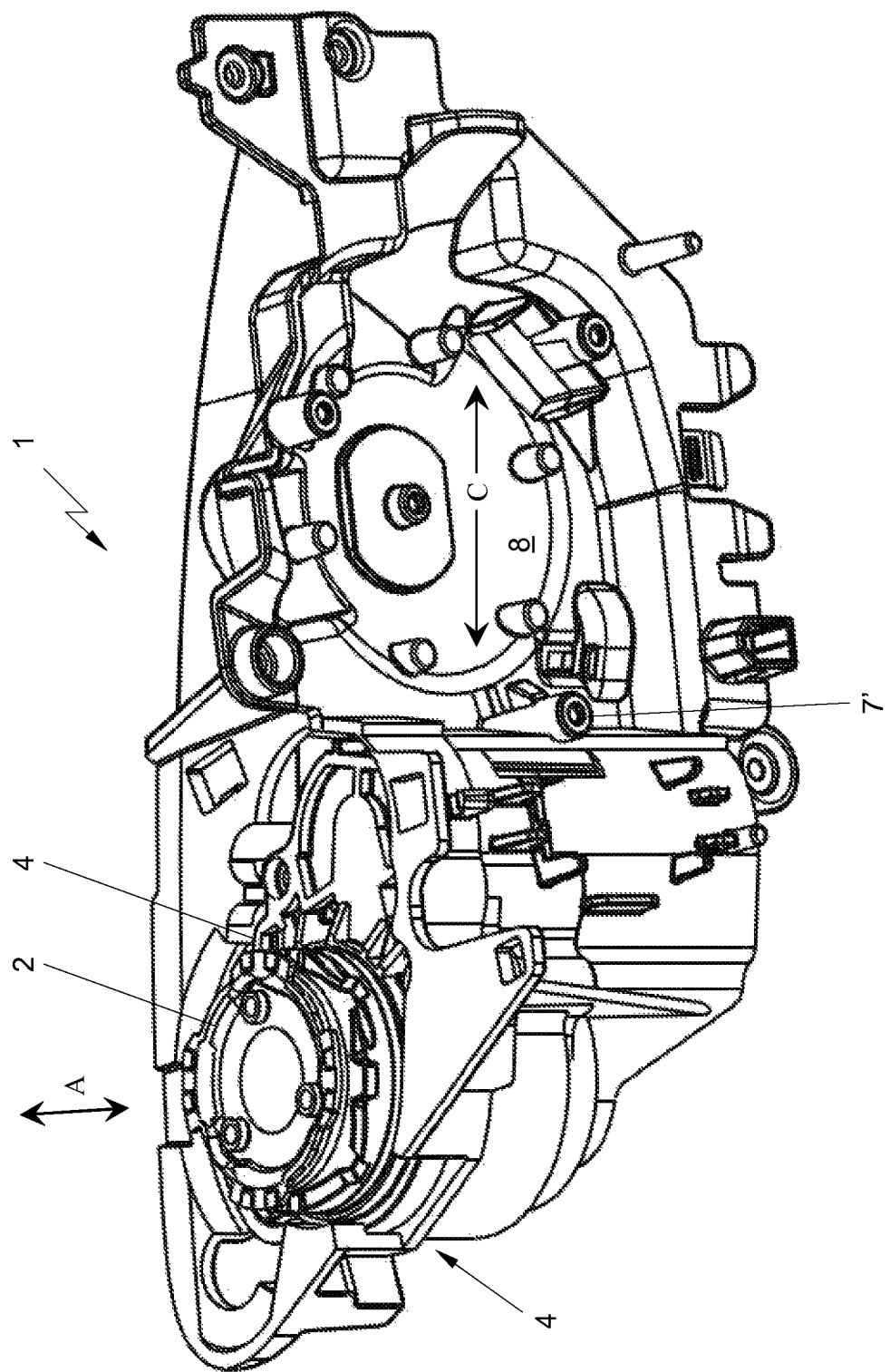
FIG. 5 shows a schematic perspective view of an underside of a fifth embodiment of a mirror support with actuator unit in an intermediate position of assembly according to the invention.

FIG. 5 shows an exemplary embodiment of a reception facility 4 which comprises a cutout in the underside of the mirror support 1. The cutout 4 is provided with additional undercuts 4a along which the actuator unit 2 can be slid so as to be inserted into the reception cavity in the mirror support.

The actuator unit 2 is installed with an axial movement, in the direction of arrow A, through the cutout 4, into the reception cavity of the mirror support 1. Thereupon the actuator unit 2 can be moved relative to the mirror support in a sliding movement, indicated with arrow C, passing under the undercuts 4a. With the aid of the undercuts 4a, the actuator unit 2 can be held in the reception cavity of the mirror support 1. Movement of the actuator unit 2 in the direction C can be blocked by a fixing means 7, for example, a wedge (shown in FIG. 6), or a screw, or a clamp, or other fixing means. Possibly, a threaded bush can be used which is also used, for example, to screw down a mirror adjustment instrument in the reception area 8. In FIG. 5 such a threaded bush is designated with 7'. The additional reception facility 4 in this exemplary embodiment comprises further the additional space in the reception cavity that is needed for sliding the actuator unit relative to the mirror support in the direction C.

Figure 6:
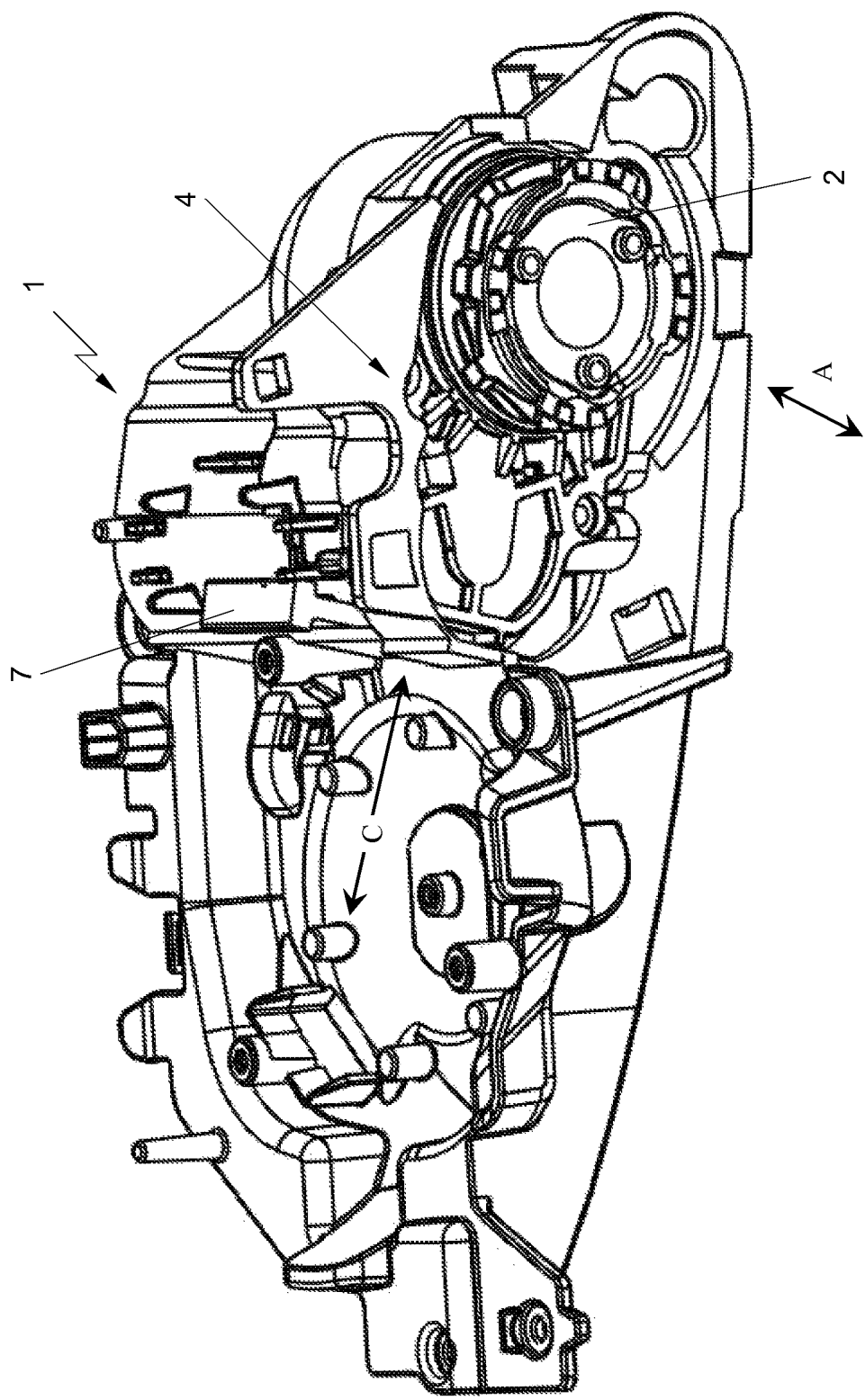
FIG. 6 shows a schematic perspective view of an underside of the fifth embodiment of FIG. 5 in fixed assembly position of a mirror support with actuator unit according to the invention.

FIG. 5 shows the actuator unit 2 in an intermediate position of the assembly, with the actuator unit 2 received in the mirror support 1 after it has been placed in axial direction A into the mirror support 1. Further, the mirror support 1 can be slid in direction C relative to the actuator unit 2 so that the end position, shown in FIG. 6, is reached. The actuator unit 2 is partly locked under the undercuts 4a and can thereupon be further fixed with the wedge 7.

The mirror support 1 can be simply detached as a whole from the actuator unit 2 by releasing the fixing means 7 and thereupon uncoupling the mirror support 1 from the actuator unit in the direction C. The mirror support 1 can then be detached as a whole from the actuator unit 2 in the direction A.

In the exemplary embodiment shown in FIG. 5 and FIG. 6, the displacement in direction C is shown as a longitudinal direction of the mirror support. However, direction C can also be a direction transverse to the mirror support or a different direction, where direction C is approximately at right angles to direction A.

Independently of the exemplary embodiments shown, at the underside of the mirror support, in the opening leading to the reception cavity for the actuator unit, extra fastening means may be arranged, such as, for example, snap fingers. After the actuator unit has been inserted wholly or partly into the reception cavity of the mirror support by an axial movement in a direction along arrow A, the actuator unit can be substantially restrained from a movement in direction A with the aid of the snap fingers which are pushed outwards during insertion of the actuator unit and thereupon snap under the actuator unit. However, the snap fingers are so designed that the mirror support can also be readily detached from the actuator unit again in direction A. Also by providing, for example, deforming ribs in the reception cavity of the mirror support, movement of the actuator unit in direction A can be substantially prevented while the mirror support can yet be simply detached from the actuator unit in that the clamping action by the deforming ribs can simply be removed again.

The invention is not limited to the exemplary embodiments represented here. The invention has been shown on the basis of exemplary embodiments in which the mirror support is designed to partly surround the actuator unit. The actuator unit can be received in a dedicated cavity of the mirror support. Other exemplary embodiments of the mirror support are also possible. For example, the actuator unit may be coupled to an outer side of the mirror support. In that case too, the actuator unit can be coupled with the mirror support, for example by a translation movement, and be fixed, for example with a clip or a screw. Many variants are possible and will be clear to those skilled in the art within the scope of the following claims.

The invention claimed is:

1. An exterior mirror unit comprising a minor base for attachment to a motor vehicle, a mirror support for holding a minor element and an actuator unit placed between the mirror support and the mirror base, wherein the actuator unit is arranged for pivoting adjustment of the minor support relative to the minor base, wherein the mirror support is connectable with the actuator unit and the mirror base in a manner detachable as a whole, wherein the mirror support is detachably connectable to the actuator unit with the aid of at least one fixing means, wherein the at least one fixing means is more or less screened by a mirror element after the mirror element is detachably mounted to the minor support, and wherein the at least one fixing means is accessible after taking off the mirror element from the mirror support.

2. The exterior minor unit according to claim 1, wherein the mirror support is detachably connectable with the aid of at most one fixing means.

3. The exterior minor unit according to claim 1, wherein the mirror support is provided with a reception facility for receiving the actuator unit in the mirror support.

4. The exterior minor unit according to claim 3, wherein the reception facility comprises a cutout for receiving the actuator unit by means of an axial movement and a pivoting movement.

5. The exterior minor unit according to claim 3, wherein the reception facility comprises a slot for receiving the actuator unit clampingly by means of an axial movement.

6. The exterior minor unit according to claim 3, wherein the reception facility comprises a cutout for receiving the actuator unit by means of an axial movement and a sliding movement.

7. A mirror support designed for assembly in an exterior minor unit, the exterior mirror unit comprising a minor base for attachment to a motor vehicle, the mirror support, for holding a minor element and an actuator unit mounted to the minor base, the minor support comprising means for detachably connecting the mirror support the actuator mounted to the minor base, wherein the mirror support is detachably connected to the actuator in a manner detachable as a whole, wherein the mirror support is arranged to receive a minor element in such a manner that the mirror element is more or less screening off a fixing means for detachably connecting the minor support to the actuator, and wherein the minor support is arranged such that the fixing means is accessible after taking of the mirror element from the mirror support.

8. A method for assembly of an exterior minor unit, comprising providing a minor base for attachment to a motor vehicle, providing a minor support, providing an actuator unit positionable between the mirror support and minor base for pivoting adjustment of the mirror support relative to the minor base, connecting the actuator unit between the mirror base and the mirror support, wherein the connecting of the mirror support with the actuator unit and the minor base is detachable so that after detachment of the minor support as a whole, the actuator unit remains connected with the mirror base, wherein the connecting of the minor support with the actuator unit is done with the aid of at least one fixing means, the method further comprising detachably mounting a minor element to the mirror support in such a manner that the minor element more or less screens off the at least one fixing means, and in such a manner that the at least one fixing means is accessible after taking of the minor element from the mirror support.

9. The method according to claim 8, wherein the mirror support is connectable in a manner detachable as a whole, with the aid of one fixing means.

10. The minor support of claim 7, wherein the means for detachably connecting comprises at most one fixing means.

11. The minor support of claim 7, further comprising a reception facility for receiving the actuator unit in the minor support.

12. The mirror support of claim 11, wherein the reception facility comprises a cutout for receiving the actuator unit by means of an axial movement and a pivoting movement.

13. The mirror support of claim 11, wherein the reception facility comprises a slot for receiving the actuator unit clampingly by means of an axial movement.

14. The minor support according to claim 11, wherein the reception facility comprises a cutout for receiving the actuator unit by means of an axial movement and a sliding movement.

\* \* \* \* \*